(12) United States Patent
Wieser et al.

(10) Patent No.: US 8,304,145 B2
(45) Date of Patent: Nov. 6, 2012

(54) HIGH TORTUOSITY DIFFUSION MEDIUM

(75) Inventors: Christian Wieser, Budenheim (DE);
Paul D. Nicotera, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 444 days.

(21) Appl. No.: 12/708,761

(22) Filed: Feb. 19, 2010

(65) Prior Publication Data

US 2011/0207022 A1    Aug. 25, 2011

(51) Int. Cl.
*H01M 4/02* (2006.01)

(52) U.S. Cl. ........ 429/534; 429/405; 429/474; 429/480; 429/481; 429/483

(58) Field of Classification Search ................... 429/405, 429/474, 480, 481, 483, 512, 532, 534
See application file for complete search history.

(56) References Cited

U.S. PATENT DOCUMENTS

2008/0206615 A1 *   8/2008   Nicotera et al. ................. 429/30
2008/0299430 A1 *  12/2008   Ichikawa et al. ................ 429/30

OTHER PUBLICATIONS

"The Use of Limiting Current to Determine Transport Resistance in PEM Fuel Cells"; ECS Transactions, vol. 3 (1) 989-999 (2006); D. Baker, C. Wieser, K.C. Neyerlin, M.W. Murphy.

* cited by examiner

*Primary Examiner* — Patrick Joseph Ryan
*Assistant Examiner* — Ben Lewis
(74) *Attorney, Agent, or Firm* — Fraser Clemens Martin & Miller LLC; J. Douglas Miller

(57) ABSTRACT

A diffusion medium for use in a PEM fuel cell including a porous spacer layer disposed between a plurality of perforated layers having variable size and frequency of perforation patterns, each perforated layer having a microporous layer formed thereon, wherein the diffusion medium is adapted to optimize water management in and performance of the fuel cell.

20 Claims, 6 Drawing Sheets

HIGH TORTUOSITY DIFFUSION MEDIUM

FIELD OF THE INVENTION

The invention relates to a fuel cell, and more particularly to a diffusion medium for a fuel cell adapted to optimize water management within the fuel cell, the diffusion medium including a porous spacer layer, a plurality of perforated layers having perforations of variable size, frequency and arrangement, and a plurality of microporous layers, wherein the microporous layers and perforated layers are disposed on the porous spacer layer.

BACKGROUND OF THE INVENTION

Fuel cells are increasingly being used as a power source for electric vehicles and other applications. In proton exchange membrane (PEM) fuel cells, hydrogen is supplied to an anode catalytic electrode of the fuel cell and air with oxygen as an oxidant is supplied to a cathode catalytic electrode of the fuel cell. The electrochemical reaction that occurs between the reactant gases in the fuel cell consumes the hydrogen at the anode side and the oxygen at the cathode side and produces product water in liquid and vapor phase at the cathode side. PEM fuel cells include a membrane electrode assembly (MEA) with a thin, proton transmissive, non-electrically conductive, solid polymer electrolyte membrane joined with the anode catalytic electrode on one face and the cathode catalytic electrode on an opposite face.

Gas diffusion media play an important role in PEM fuel cells. Generally disposed between catalytic electrodes and the flow field channels of the bipolar plates in the fuel cell, the porous gas diffusion media provide reactant and product permeability, electrical conductivity, and thermal conductivity, as well as mechanical support for the soft MEA. Efficient operation of the fuel cell depends on the ability to provide effective water management in the system. In PEM fuel cells, the water management has to be carefully balanced to provide the proton exchange membrane with enough water to be sufficiently proton conductive and at the same time remove product water effectively in order to ensure that the gaseous reactants can access the catalytic electrodes without blockage by films or puddles of liquid water.

At dry operating conditions for which the unhumidified reactant gases are fed to the fuel cell, which is preferred to simplify the fuel cell system, product water mainly exists in vapor phase, i.e. occurrence of liquid water does not happen or only in small amounts. In this situation, the water vapor has to provide the source for membrane humidification in order to provide proton conductivity. The degree of humidity at the location of the membrane and catalytic electrode is closely related to the gas transport resistance of the gas diffusion medium since the vapor diffuses across the diffusion medium into the flow field channel. Consequently, high transport resistances are desired to keep the membrane humidified in dry situations by utilizing the product water vapor. In contrast to that, wet operating conditions (where the reactant gases are saturated with vapor and condensation can occur) provide water for membrane humidification in abundance, and low transport resistances for reactant access and water removal are required.

Typically, diffusion media used in PEM fuel cells have relatively constant transport resistance over the entire area of the media because the structure, size, and frequency of the pores in the diffusion media are uniform. Furthermore, the transport resistance of state-of-the-art materials is usually very low. The performance of automotive fuel cells using such current diffusion media is limited because reactant streams are often subsaturated with water vapor at the cell inlet but get increasingly saturated with vapor up to the point of condensation along the flow direction at the outlet. Hence, there is a large variation of humidity and current (i.e. water production) over the active area of the cell from flow inlet to outlet. Thus, a rate of product water removal in wet operating regions close to the cell outlet must be balanced with the need to retain water close to the cell inlet in order to maintain membrane hydration. The unresolved problem, hence, is to provide a fuel cell diffusion medium with varying transport resistance across the active area exhibiting high transport resistance at the cell inlet for water vapor retention at the membrane and low transport resistance at the outlet where water has to be removed effectively.

The gas transport resistance is defined as "$f \cdot h/D_{\textit{eff}}$", where "f" is a geometrical factor to account for land-channel geometry if the measurement of the gas transport resistance is done in a fuel cell configuration, "h" is the layer thickness, and "$D_{\textit{eff}}$" is the effective diffusion coefficient. The effective diffusion coefficient describes the diffusion coefficient of the gas species under consideration (e.g. water vapor) in the gas mixture (e.g. air) in the presence of a porous material. As on one hand the solid fraction in the porous material fills up a portion of the space that normally is accessible for diffusion and the diffusive flux (porosity effect), and on the other hand the pores usually are not straight across the porous material but inclined or wound thereby extending the path length (tortuosity effect), the effective diffusion coefficient naturally is smaller than the free diffusion coefficient. The effective diffusivity of porous materials is typically defined as $D_{\textit{eff}} = D \cdot \epsilon / \tau$, where D is the free diffusion coefficient of the species in the mixture in absence of the porous material, $\epsilon$ is the porosity of the porous material (i.e. the ratio of the pore volume to the overall material volume) and $\tau$ is the tortuosity of the transport path in the pores of the porous material. Typically, the ratio of the free diffusion coefficient to the effective diffusion coefficient $D/D_{\textit{eff}}$ is a quantitative measure for how far the porous medium constitutes an obstacle to the diffusion and diffusive flux. Derivation of the gas transport resistance term is described in the reference "D. Baker, C. Wieser, K. C. Nyerlin, and M. W. Murphy, "The Use of Limiting Current to Determine Transport Resistance in PEM Fuel Cells," ECS Transactions, Vol. 3, pp. 989-999 (2006), hereby incorporated herein by reference in its entirety.

Since the layer thickness in fuel cell applications is limited due to technical restrictions, increasing the transport resistance by increasing the layer thickness is usually not possible. Hence, decreasing the effective diffusivity is required. This can be done by either decreasing the porosity $\epsilon$, increasing the tortuosity $\tau$, or both. Analytical studies have shown that porosity needs to be significantly reduced to show an effect, and furthermore the degree to which porosity can be reduced in current materials (which are random porous media based on carbon fiber papers with particulate coating made from carbon black) is limited, too. Hence, an attempt has been made to increase the tortuosity of gas diffusion media in a controlled manner.

Accordingly, the present invention is a diffusion medium adapted to provide varying local water management capability to enable optimized fuel cell performance. In the diffusion medium described herein, the diffusive gas transport resistance of the diffusion medium is maximized by varying the structure, size, frequency and arrangement of the pores particularly aiming at increasing the tortuosity, thereby maximizing an amount of water vapor retained in the PEM for hydration. Simultaneously, the transport resistance of the diffusion medium is localized and controlled across the diffusion medium by varying the structure, size, frequency and arrangement of the pores therein particularly aiming at controlling the tortuosity to selectively vary the transport resistance and tortuosity of the diffusion medium.

SUMMARY OF THE INVENTION

Concordant and congruous with the present invention a diffusion medium adapted to optimize water management while also improving the performance and the operation robustness of the fuel cell has been discovered.

In one embodiment, a diffusion medium for use in a PEM fuel cell comprises a first perforated layer having a plurality of perforations formed therein; a second perforated layer having a plurality of perforations formed therein; an electrically conductive porous layer as a spacer disposed between the first perforated layer and the second perforated layer; a first microporous layer disposed on the first perforated layer; and a second microporous layer disposed on the second perforated layer; the microporous layers may penetrate into the pores of the first and the second perforated layers as well as into the porous spacer.

In one embodiment, a diffusion medium for use in a PEM fuel cell comprises a first perforated layer having a plurality of perforations formed therein; a second perforated layer having a plurality of perforations formed therein; an electrically conductive porous spacer layer disposed between said first perforated layer and said second perforated Layer; a first microporous layer disposed on said first perforated layer; and a second microporous layer disposed on said second perforated layer.

In another embodiment, a diffusion medium for use in a PEM fuel cell comprises a first perforated layer having a plurality of perforations formed therein, wherein the perforations of said first perforated layer are spaced apart to result in a perforation density gradient; a second perforated layer having a plurality of perforations formed therein; an electrically conductive porous spacer layer disposed between said first perforated layer and said second perforated layer; a first microporous layer disposed on said first perforated layer; and a second microporous layer disposed on said second perforated layer.

In another embodiment, a diffusion medium for use in a PEM fuel cell comprises a first perforated layer having a plurality of perforations formed therein; a second perforated layer having a plurality of perforations formed therein, wherein a distance between the perforations of said first perforated layer is greater than a distance between the perforations of said second perforated layer; an electrically conductive porous spacer layer disposed between said first perforated layer and said second perforated layer; a first microporous layer disposed on said first perforated layer; and a second microporous layer disposed on said second perforated layer.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1A:
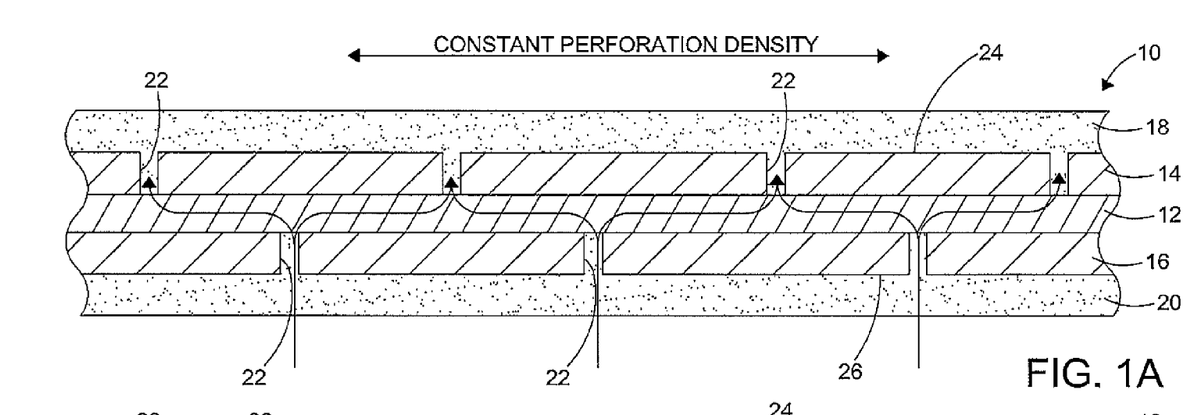
FIG. 1a is a fragmentary cross-sectional elevational view of a gas diffusion medium according to an embodiment of the invention.
Figure 1B:
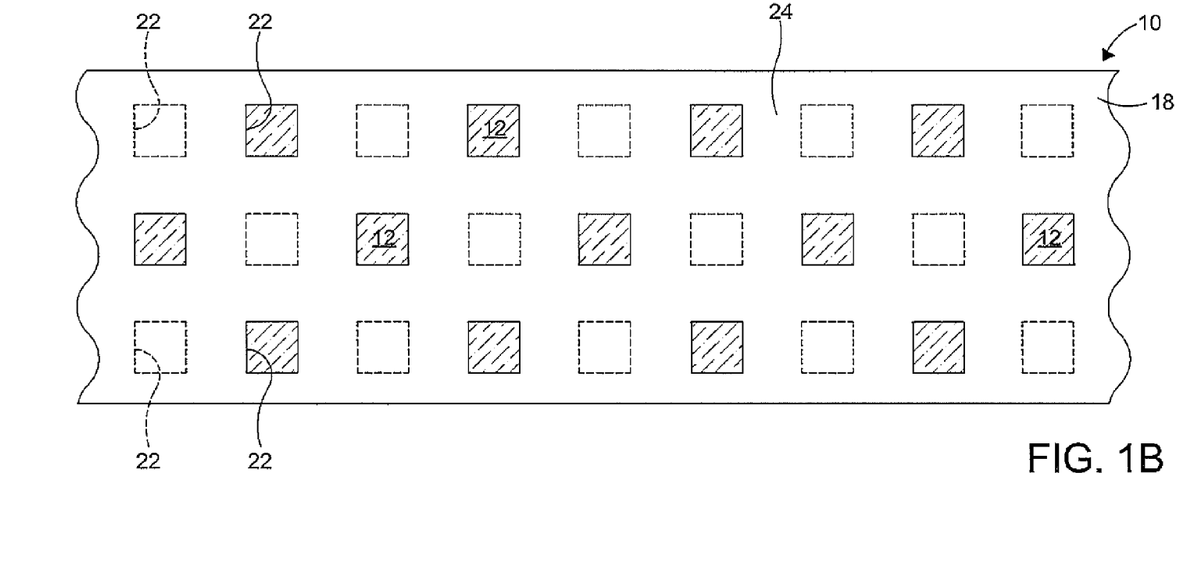
FIG. 1b is a top plant view of the gas diffusion medium of FIG. 1a, with a first microporous layer removed.

FIGS. 1a and 1b illustrate a diffusion medium 10 according to an embodiment of the invention. The diffusion medium 10 includes a porous spacer layer 12, a first perforated layer 14, a second perforated layer 16, a first microporous layer 18, and a second microporous layer 20. It is understood that a thickness of the diffusion medium 10 and layers 12, 14, 16, 18, 20 thereof may vary based on a desired performance of a fuel cell in which the diffusion medium 10 is used. Based on the above description of the concept of tortuosity, the thickness of the porous spacer layer 12 should be minimized to maximize tortuosity (and minimize the through-plane electrical resistance) of the diffusion medium 10. Of course, the porous spacer layer 12 must have some finite thickness in order to enable gas transport where the perforations in the layer 14, 16 are not aligned. However, for increasing the gas transport resistance, a porous spacer layer 12 having a minimized thickness may enhance the effect of increased tortuosity by reducing in-plane cross-section available for gas transport.

As shown, the porous spacer layer 12 is a carbon fiber paper (CFP) disposed between the perforated layers 14, 16. The porous spacer layer 12 is treated with a fluorocarbon polymer such as polytetrafluoroethylene (PTFE) (not shown). Any traditional CFP such as, for instance, Toray TGPH-060, may be used. It is understood that the porous spacer layer 12 may also be a carbon cloth, a foam, or other conventional material adapted to be electrically and thermally conductive. Furthermore, the porous spacer layer 12 may be untreated or treated with materials other than a fluorocarbon polymer, as desired.

Each of the first perforated layer 14 and the second perforated layer 16 include a plurality of selectively distributed perforations 22. The first perforated layer 14 is disposed between the first microporous layer 18 and the porous spacer layer 12. The second perforated layer 16 is disposed between the second microporous layer 20 and the porous spacer layer 12. In the embodiment shown, the perforated layers 14, 16 are formed from a graphite foil. However, the perforated layers 14, 16 may be formed from other conventional materials such as metal sheets, polymeric materials, composite materials, impregnated polymeric materials, or any conventional electrically conductive materials, for example. It is understood that the perforated layers 14, 16 may be formed from non-conductive materials.

In the embodiment shown in FIGS. 1a and 1b, the size and frequency of the perforations 22 per area, collectively known as the perforation density, of the first perforated layer 14 is substantially similar to the perforation density of the second perforated layer 16. However, the perforations 22 of the first perforated layer 14 are offset from the perforations 22 of the second perforated layer 16 to avoid alignment therewith. The size and frequency of the perforations 22 in the perforated layers 14, 16 may be further varied to provide a different open area (i.e. pore volume). Reducing the frequency of the perforations 22 in the perforated layers 14, 16 results in a higher tortuosity ($\tau$) (i.e. effective pore length) of the diffusion medium 10. A uniform piece of graphite foil may be used to form the perforated layers 14, 16 or the perforated layers 14, 16 may each be formed from a plurality of graphite foil sheets having a different size and frequency of the perforations disposed adjacent one another. The perforated layers 14, 16 may also be composed of noble metals or conductive oxides that are electrochemically compatible with hydrogen fuel cells. If the materials forming the microporous layers 18, 20 is/are sufficiently electrically conductive, and the perforated layers 14, 16 are mechanically strong enough, then the porous spacer layer 12 may be composed of a microporous layer material (a mixture of conductive and hydrophobic particles) and/or the perforated layers 14, 16 may be made from non-conductive solids, such as polymer films, or semi-conductive solids. Alternatively, the perforated layers 14, 16 may be coated or formed directly on the porous spacer layer 12, using masking techniques or photochemical treatments to generate the desired perforation patterns in these layers during or after film formation.

The first microporous layer 18 and the second microporous layer 20 shown are formed from carbon black particles. The microporous layers 18, 20 may also be formed from a carbon black particles and fluorocarbon polymer mixture. The thickness and effective diffusivity of the microporous layers 18, may vary to tailor the transport resistance of the microporous layers 18, 20, as desired. It is understood that the first microporous layer 18 or the second microporous layer 20 may be formed to be, and function as, the spacer layer 12, as desired.

To form the diffusion medium 10, the porous spacer layer 12 is treated hydrophobically, e.g. with PTFE, to form a treated porous spacer layer 12. The perforated layers 14, 16, each having a desired open area and perforation pattern, are formed from a sheet of graphite foil (not shown) by rolling the graphite sheet between rollers (not shown) having protuberant elements adapted to produce the perforations 22 in the foil to result in a desired perforation density. A continuous process similar to the one described in U.S. Pat. No. 6,521,369 to Mercuri et al., hereby incorporated herein by reference in its entirety, or a multi-step process may be used to form the perforated layers 14, 16, as desired. The size and placement of the protuberant elements on the rollers will vary based on the desired pattern, shape, and size of the perforations 22 to obtain the desired perforation density and diffusion resistance through the diffusion medium 10. Other mechanical methods to generate the perforations and perforation patterns may for instance comprise laser drilling or water jet drilling. Chemical methods may also be used to generate perforations in solid, free-standing layers by adding "fugitive" particles or pore formers that will decompose and leave voids after heat treatment or a washing step. The perforated layers 14, 16 may be pressed onto the porous spacer layer 12 while the PTFE dispersion applied to the spacer layer is still wet, or the perforated layers 14, 16 may be adhered to the porous spacer layer 12 using conventional adhesives or hot press methods, as desired.

Next, a paste (not shown) is formed containing carbon black particles. The paste is applied to a first side 24 of the first perforated layer 14 to form the first microporous layer 18 wherein the first microporous layer 18 permeates into the perforations 22 of the first perforated layer 14. The paste is also applied to a first side 26 of the second perforated layer 16 to form the second microporous layer 20 wherein the second microporous layer 20 permeates into the perforations 22 of the second perforated layer 16. The microporous layers 18, 20 are then allowed to dry.

The treated porous spacer layer 12, the perforated layers 14, 16, and the microporous layer 18, 20 are then sintered at or near 380° C. to form the diffusion medium 10. The sintering process causes the porous spacer layer 12, the perforated layers 14, 16, and the microporous layers 18, 20 to adhere together. Commonly owned U.S. Pat. No. 7,063,913 for DIFFUSION MEDIA WITH A MICROPOROUS LAYER is hereby incorporated by reference in its entirety to further describe methods for preparing the paste and other materials and processes used in preparing the diffusion medium 10. It is understood that if the perforated layers 14, 16 are formed from polymeric materials, the porous spacer layer 12, the perforated layers 14, 16 and the microporous layers 18, 20 may be hot pressed to cause the layers 12, 14, 16, 18, 20 to adhere together and that other methods of forming the diffusion medium 10 may be used.

Figure 2:
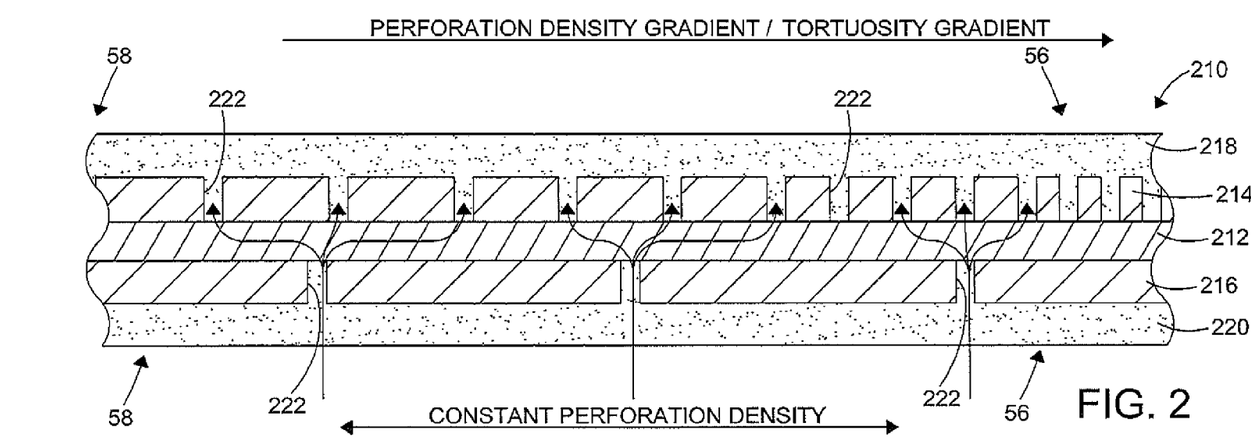
FIG. 2 is a fragmentary cross-sectional elevational view of a gas diffusion medium according to another embodiment of the invention.

FIG. 2 shows a diffusion medium 210 according to another embodiment of the invention. The embodiment of FIG. 2 is similar to the diffusion medium 10 of FIGS. 1a and 1b except as described below. Like the structure from FIGS. 1a and 1b, FIG. 2 includes reference numerals in the 200s instead of the 10s, with the remaining two digits the same. The diffusion medium 210 includes a porous spacer layer 212, a first perforated layer 214, a second perforated layer 216, a first microporous layer 218, and a second microporous layer 220. It is understood that a thickness of the diffusion medium 210 and layers 212, 214, 216, 218, 220 thereof may vary based on a desired performance of a fuel cell in which the diffusion medium 210 is used.

As shown, the porous spacer layer 212 is a carbon fiber paper (CFP) disposed between the perforated layers 214, 216. The porous spacer layer 212 is treated with a fluorocarbon polymer such as polytetrafluoroethylene (PTFE) (not shown). Any traditional CFP such as the MRC U-105 paper produced by Mitsubishi Rayon Company may be used. It is understood that the porous spacer layer 212 may also be a carbon cloth, a foam, or other conventional material adapted to be electrically and thermally conductive. Furthermore, the porous spacer layer 212 may be untreated or treated with materials other than a fluorocarbon polymer, as desired. Furthermore, the porous spacer layer 212 may be untreated or treated with materials other than a fluorocarbon polymer, as desired.

Each of the first perforated layer 214 and the second perforated layer 216 include a plurality of selectively distributed perforations 222. The first perforated layer 214 is disposed between the first microporous layer 218 and the porous spacer layer 212. The second perforated layer 216 is disposed between the second microporous layer 220 and the porous spacer layer 212. In the embodiment shown, the perforated layers 214, 216 are each formed from a graphite foil. However, the perforated layers 214, 216 may be formed from other conventional materials such as metal sheets, polymeric materials, composite materials, impregnated polymeric materials, or any conventional electrically conductive materials, for example. The perforated layers 214, 216 may be formed from non-conductive materials, too, but the expected ohmic loss for such a configuration would be expected large so perforated conductive layers are preferable.

In the embodiment shown in FIG. 2, the perforation density of the first perforated layer 214 is different than the perforation density of the second perforated layer 216. The perforation density of the second perforated layer 216 is substantially uniform, while the perforation density of the first perforated layer 214 varies along a length thereof. The perforation density along a first end 56 of the first perforated layer 214 is greater than a perforation density along a second end 58 of the first perforated layer 214. A distance between the perforations 222 incrementally increases from the first end 56 to the second end 58, thereby resulting in a perforation density gradient. The first end 56 having the highest perforation density is disposed adjacent reactant outlet apertures of fuel cell plates disposed adjacent the diffusion medium 210, while the second end 58 having the lowest perforation density is disposed adjacent reactant inlet apertures of the fuel cell plates. The perforations 222 of the first perforated layer 214 are offset from the perforations 222 of the second perforated layer 216 to avoid alignment therewith.

The size and frequency of the perforations 222 in the perforated layers 214, 216 may be further varied to provide a different volume of perforations 222, as desired. Reducing the frequency of the perforations 222 in the perforated layers 214, 216 results in a higher tortuosity ($\tau$) (i.e. effective pore length) of the diffusion medium 210. A uniform piece of graphite foil, metal, polymeric, composite, or impregnated polymeric sheets may be used to form the perforated layers 214, 216 or the perforated layers 214, 216 may each be formed from a plurality of these sheets having a different size and frequency of the perforations disposed adjacent one another. Furthermore, the plurality of sheets may be made from the same material or the sheets may be combinations of the different materials stacked together.

The first microporous layer 218 and the second microporous layer 220 shown are formed from carbon black particles. The microporous layers 218, 220 may also be formed from a carbon black particles and fluorocarbon polymer mixture. The thickness and effective diffusivity of the microporous layers 218, 220 may be chosen to selectively vary the transport resistance of the microporous layers 218, 220, as desired. It is understood that the first microporous layer 218 or the second microporous layer 220 may be formed to be, and function as, the spacer layer 212, as desired.

By varying the size of the perforations 222, the perforation density, and the geometrical pattern of the perforations 222 of the perforated layers 214, 216, the overall gas diffusion properties through the porous spacer layer 212 is varied. By reducing the size and frequency of the perforations 222, the porosity ($\epsilon$) is lowered, while reducing the frequency of the perforations 222 results in a higher tortuosity ($\tau$) of the diffusion medium 210. Because the perforations 222 of the first perforated layer 214 are offset from the perforations 222 of the second perforated layer 216, the tortuosity of the diffusion medium 210 is maximized, thereby maximizing a path length the reactant gases travel to flow through the porous spacer layer 212. Because tortuosity may be selectively increased or decreased, gas transport through the porous spacer layer 212 and the transport resistance thereof may be controlled. Because the first perforated layer 214 has a decreasing perforation density gradient from the first end 56 to the second end 58, the tortuosity of the perforated layer incrementally increases from the first end 56 to the second end 58. The ratio between the free diffusion coefficient (D) and effective diffusion coefficient ($D_{eff}$) through the gas diffusion layer depends on both the porosity and the tortuosity of the diffusion medium 210. The relationship is represented as $$\frac{D}{D_{eff}} = \frac{\tau}{\varepsilon}.$$

Accordingly, a reduction in size and spatial frequency of the perforations 222 in the perforated layers 214, 216 of the diffusion medium 210 will result in an increase of $$\frac{D}{D_{eff}},$$

and the decrease in the perforation density of the first perforated layer 214 from the first end 56 to the second end 58 results in an increase of $$\frac{D}{D_{eff}}$$

from the first end 56 to the second end 58.

Figure 3:
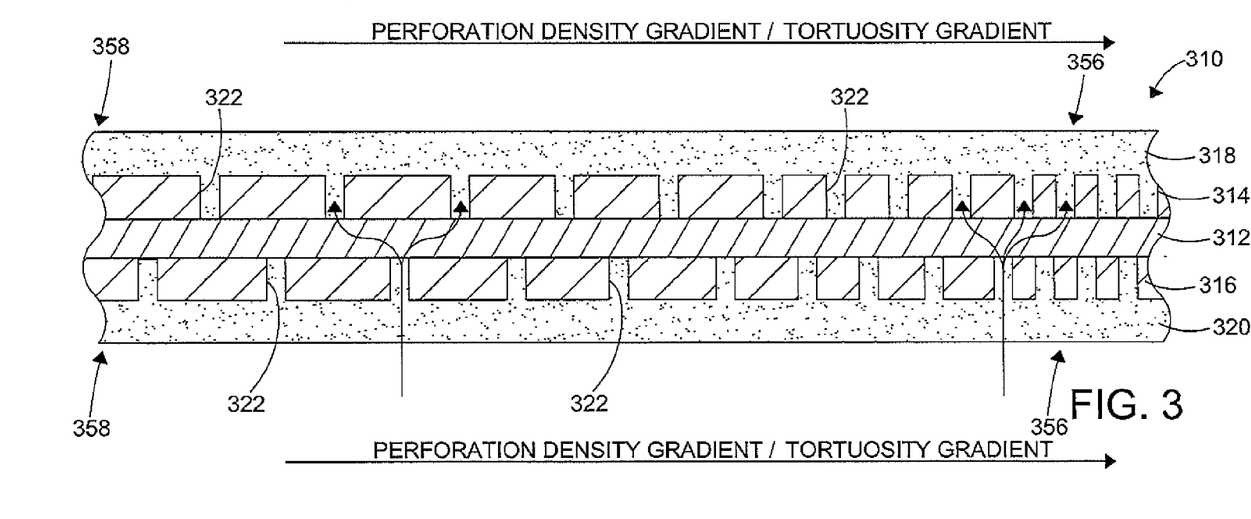
FIG. 3 is a fragmentary cross-sectional elevational view of a gas diffusion medium according to another embodiment of the invention.

FIG. 3 shows a diffusion medium 310 according to another embodiment of the invention. The embodiment of FIG. 3 is similar to the diffusion medium 10 of FIGS. 1a and 1b except as described below. Like the structure from FIGS. 1a and 1b, FIG. 3 includes reference numerals in the 300s instead of the 10s, with the remaining two digits the same. The diffusion medium 310 includes a porous spacer layer 312, a first perforated layer 314, a second perforated layer 316, a first microporous layer 318, and a second microporous layer 320. It is understood that a thickness of the diffusion medium 310 and layers 312, 314, 316, 318, 320 thereof may vary based on a desired performance of a fuel cell in which the diffusion medium 310 is used.

As shown, the porous spacer layer 312 is a carbon fiber paper (CFP) disposed between the perforated layers 314, 316. The porous spacer layer 312 is treated with a fluorocarbon polymer such as polytetrafluoroethylene (FIFE) (not shown). Any traditional CFP such as the MRC U-105 paper produced by Mitsubishi Rayon Company may be used. It is understood that the porous spacer layer 312 may also be a carbon cloth, a foam, or other conventional material adapted to be electrically and thermally conductive. Furthermore, the porous spacer layer 312 may be untreated or treated with materials other than a fluorocarbon polymer, as desired.

Each of the first perforated layer 314 and the second perforated layer 316 include a plurality of selectively distributed perforations 322. The first perforated layer 314 is disposed between the first microporous layer 318 and the porous spacer layer 312. The second perforated layer 316 is disposed between the second microporous layer 320 and the porous spacer layer 312. In the embodiment shown, the perforated layers 314, 316 are each formed from a graphite foil. However, the perforated layers 314, 316 may be formed from other conventional materials such as metal sheets, polymeric materials, composite materials, impregnated polymeric materials, or any conventional electrically conductive materials, for example. The perforated layers 314, 316 may be formed from non-conductive materials, too, but the expected ohmic loss for such a configuration would be expected large so perforated conductive layers are preferable.

In the embodiment shown in FIG. 3, the perforation density of the perforated layers 314, 316 is substantially non-uniform. The perforations 322 of the perforated layers 314, 316 are of substantially similar size, while the frequency of the perforations 322 varies across the respective lengths thereof. A perforation density on a first end 356 of the perforated layers 314, 316 is greater than a perforation density on a second end 358 of the perforated layers 314, 316. The distance between the perforations 322 of the perforated layers 314, 316 incrementally increases from the respective first ends 356 to the respective second ends 358, thereby resulting in a perforation density gradient. The first end 356 having the highest perforation density is disposed adjacent reactant outlet apertures of fuel cell plates disposed adjacent the diffusion medium 310, while the second end 358 having the lowest perforation density is disposed adjacent reactant inlet apertures of the fuel cell plates. The perforations 322 of the first perforated layer 314 are offset from the perforations 322 of the second perforated layer 316 to avoid alignment therewith.

The size and frequency of the perforations 322 in the perforated layers 314, 316 may be further varied to provide a different volume of perforations 322, as desired. Reducing the frequency of the perforations 322 in the perforated layers 314, 316 results in a higher tortuosity (i.e. effective pore length) of the diffusion medium 310. A uniform piece of graphite foil may be used to form the perforated layers 314, 316 or the perforated layers 314, 316 may each be formed from a plurality of graphite foil sheets having a different size and frequency of the perforations disposed adjacent one another.

The first microporous layer 318 and the second microporous layer 320 shown are formed from carbon black particles. The microporous layers 318, 320 may also be formed from a carbon black particles and fluorocarbon polymer mixture. The thickness and effective diffusivity of the microporous layers 318, 320 may vary to select the transport resistance of the microporous layers 318, 320, as desired.

By varying the size, spatial frequency, and geometrical pattern of the perforated layers 314, 316 the overall gas diffusion properties through the porous spacer layer 312 is varied. By reducing the size and frequency of the perforations 322, the porosity ($\epsilon$) is lowered, while reducing the frequency of the perforations 322 results in a higher tortuosity ($\tau$) of the diffusion medium 310. Because the perforations 322 of the first perforated layer 314 are offset from the perforations 322 of the second perforated layer 316, the tortuosity of the diffusion medium 310 is maximized. With a maximized tortuosity, the path the reactant gases travel to flow through the porous spacer layer 312 is also maximized, thereby impeding gas transport therethrough and, hence, maximizing transport resistance thereof. Because the first perforated layer 314 has a decreasing perforation density gradient from the first end 356 to the second end 358, the tortuosity of the perforated layer incrementally increases from the first end 356 to the second end 358. The ratio between the free diffusion coefficient (D) and effective diffusion coefficient ($D_{eff}$) through the gas diffusion layer depends on both the porosity and the toruosity of the diffusion medium 310. The relationship is represented as $$\frac{D}{D_{eff}} = \frac{\tau}{\epsilon}.$$

Accordingly, a reduction in size and spatial frequency of the perforations 322 in the perforated layers 314, 316 of the diffusion medium 310 will result in an increase of $$\frac{D}{D_{eff}},$$

and the decrease in the perforation density of the first perforated layer 314 from the first end 356 to the second end 358 results in an increase of $$\frac{D}{D_{eff}}$$

from the first end 356 to the second end 358.

Figure 4A:
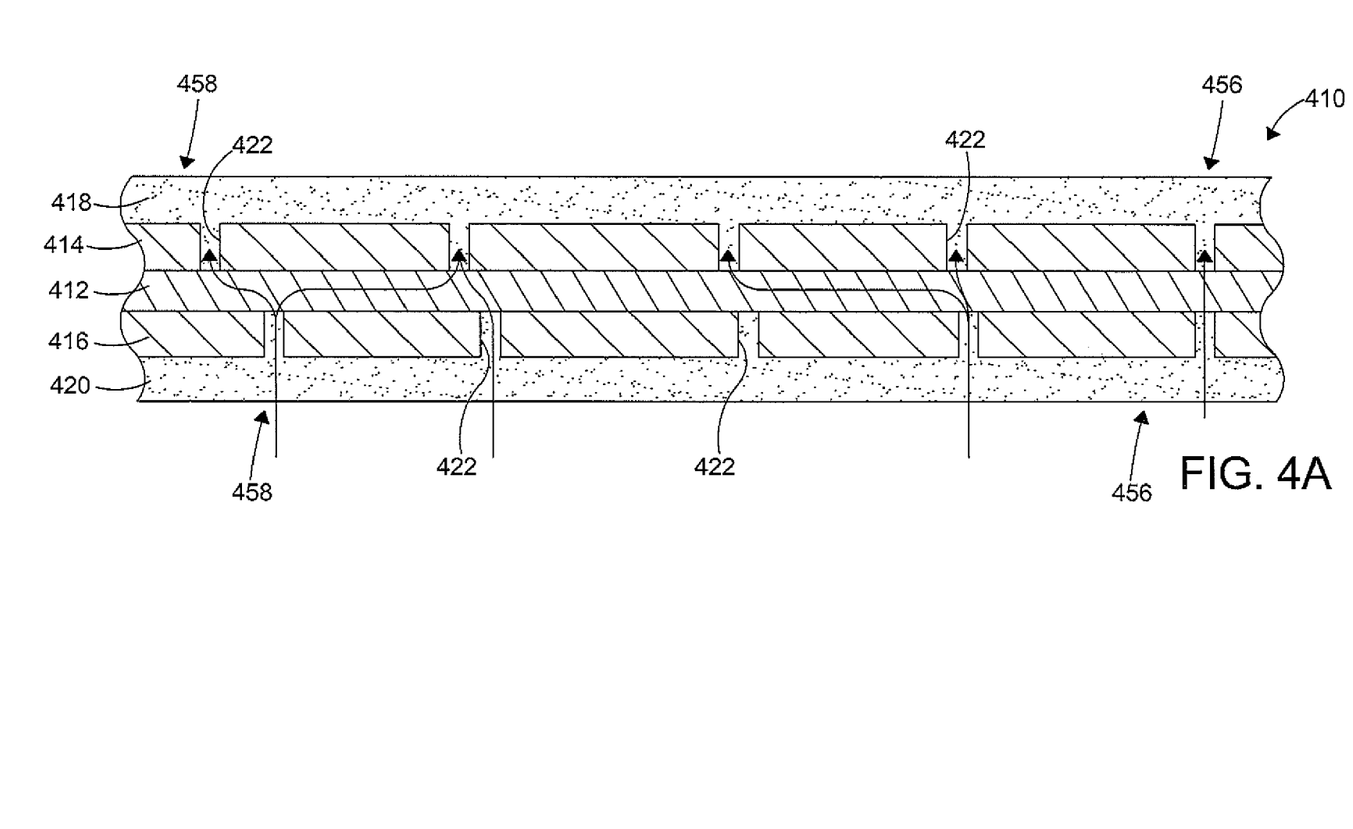
FIG. 4a is a fragmentary cross-sectional elevational view of a gas diffusion medium according to another embodiment of the invention.
Figure 4B:
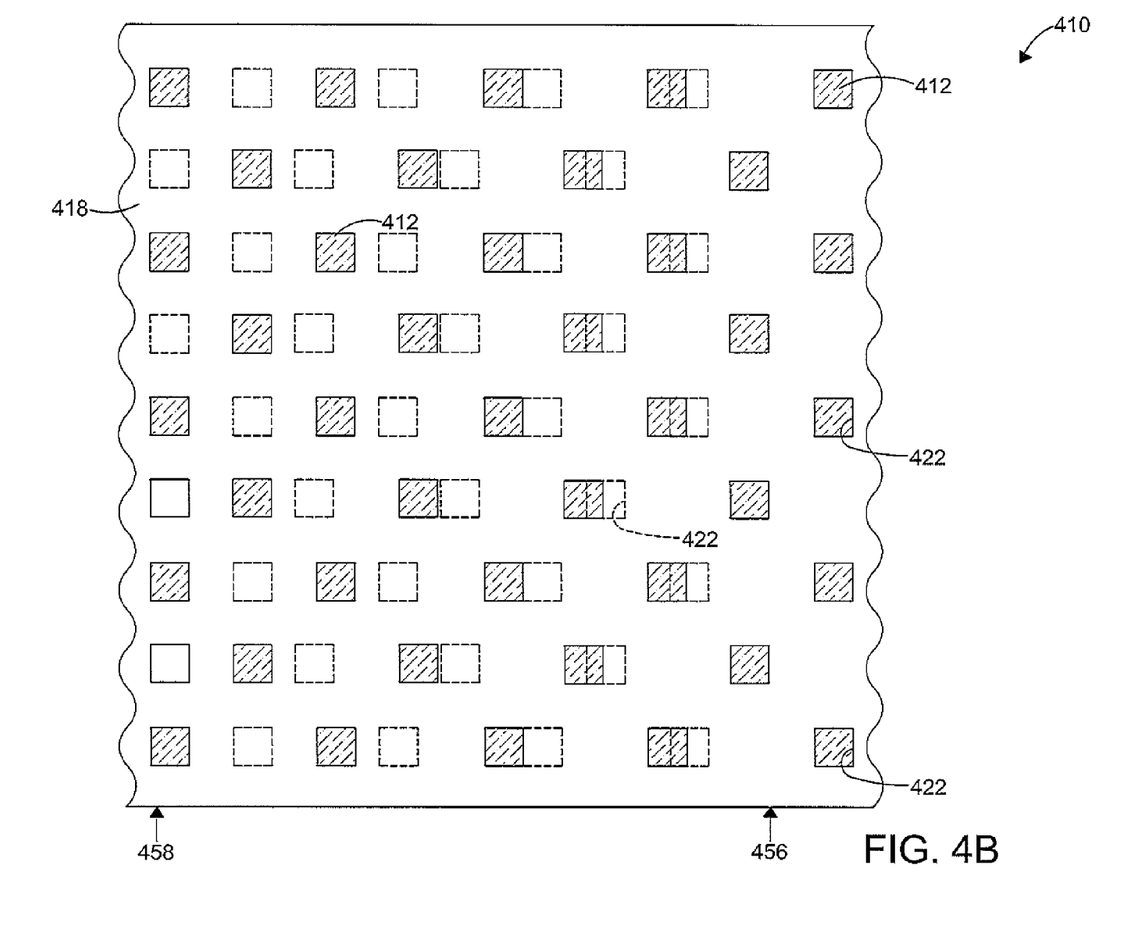
FIG. 4b is a top plant view of the gas diffusion medium of FIG. 4a, with a first microporous layer removed.

FIGS. 4a and 4b show a diffusion medium 410 according to another embodiment of the invention. The embodiment of FIGS. 4a and 4b is similar to the diffusion medium 10 of FIGS. 1a and 1b except as described below. Like the structure from FIGS. 1a and 1b, FIGS. 4a and 4b include reference numerals in the 400s instead of the 10s, with the remaining two digits the same. The diffusion medium 410 includes a porous spacer layer 412, a first perforated layer 414, a second perforated layer 416, a first microporous layer 418, and a second microporous layer 420. It is understood that a thickness of the diffusion medium 410 and layers 412, 414, 416, 418, 420 thereof may vary based on a desired performance of a fuel cell in which the diffusion medium 410 is used.

As shown, the porous spacer layer 412 is a carbon fiber paper (CFP) disposed between the perforated layers 414, 416. The porous spacer layer 412 is treated with a fluorocarbon polymer such as polytetrafluoroethylene (PTFE) (not shown). Any traditional CFP such as the MRC U-105 paper produced by Mitsubishi Rayon Company may be used. It is understood that the porous spacer layer 412 may also be a carbon cloth, a foam, or other conventional material adapted to be electrically and thermally conductive. Furthermore, the porous spacer layer 412 may be untreated or treated with materials other than a fluorocarbon polymer, as desired. Furthermore, the porous spacer layer 412 may be untreated or treated with materials other than a fluorocarbon polymer, as desired.

Each of the first perforated layer 414 and the second perforated layer 416 include a plurality of selectively distributed perforations 422. The first perforated layer 414 is disposed between the first microporous layer 418 and the porous spacer layer 412. The second perforated layer 416 is disposed between the second microporous layer 420 and the porous spacer layer 412. In the embodiment shown, the perforated layers 414, 416 are each formed from a graphite foil. However, the perforated layers 414, 416 may be formed from other conventional materials such as metal sheets, polymeric materials, composite materials, impregnated polymeric materials, or any conventional electrically conductive materials, for example. The perforated layers 414, 416 may be formed from non-conductive materials, too, but the expected ohmic loss for such a configuration would be expected large so perforated conductive layers are preferable.

In the embodiment shown in FIGS. 4a and 4b, the perforation density of the perforated layers 414, 416 is substantially uniform. The perforations 422 of the perforated layers 414, 416 are of substantially similar size, while the distance between the perforations 422 thereof differs. The distance between the perforations 422 of the first perforated layer 414 is greater than the distance between the perforations 422 of the second perforated layer 416. The perforations 422 of the first perforated layer 414 are substantially aligned with the perforations 422 of the second perforated layer 416 at second ends 458 thereof, while the perforations 422 of the first perforated layer 414 are completely offset from the perforations 422 of the second perforated layer 416 at the first ends 456 of the perforated layers 414, 416 to avoid alignment therewith. The perforations 422 of the first perforated layer 414 become progressively less aligned with the perforations 422 of the second perforated layer 416 as the perforations 422 between the ends 456, 458 are closer to the first end 456.

The size and frequency of the perforations 422 in the perforated layers 414, 416 may be further varied to provide a different volume of perforations 422, as desired. Reducing the frequency of the perforations 422 in the perforated layers 414, 416 results in a higher tortuosity (i.e. effective pore length) of the diffusion medium 410. A uniform piece of graphite foil may be used to form the perforated layers 414, 416 or the perforated layers 414, 416 may each be formed from a plurality of graphite foil sheets having a different size and frequency of the perforations disposed adjacent one another.

The first microporous layer 418 and the second microporous layer 420 shown are formed from carbon black particles. The microporous layers 418, 420 may also be formed from a carbon black particles and fluorocarbon polymer mixture. The thickness and effective diffusivity of the microporous layers 418, 420 may vary to selectively alter the transport resistance of the microporous layers 418, 420, as desired. It is understood that the first microporous layer 418 or the second microporous layer 420 may be formed to be, and function as, the spacer layer 412, as desired.

By varying the size, spatial frequency, and geometrical pattern of the perforated layers 414, 416 the overall gas diffusion properties through the porous spacer layer 412 is varied. The porosity ($\epsilon$) of the perforated layers 414, 416 is substantially uniform, while the distance between the respective perorations 422 of the perforated layers 414, 416 differs. At the second end 458 of the diffusion medium 410, the respective perforations 422 of the perforated layers 414, 416 are substantially aligned, thereby resulting in a minimized tortuosity. At the first end 456 of the diffusion medium 410, the respective perforations 422 of the perforated layers 414, 416 are offset, thereby resulting in a maximized tortuosity. With a maximized tortuosity, the path the reactant gases travel to flow through the porous spacer layer 412 is also maximized, thereby impeding gas transport therethrough and, hence, maximizing transport resistance thereof. Because the distance between the respective perforations 422 of the respective perforated layers 414, 416 differs, the tortuosity of the diffusion medium 410 incrementally decreases from the first end 456 to the second end 458, thereby resulting in a tortuosity gradient.

Figure 5:
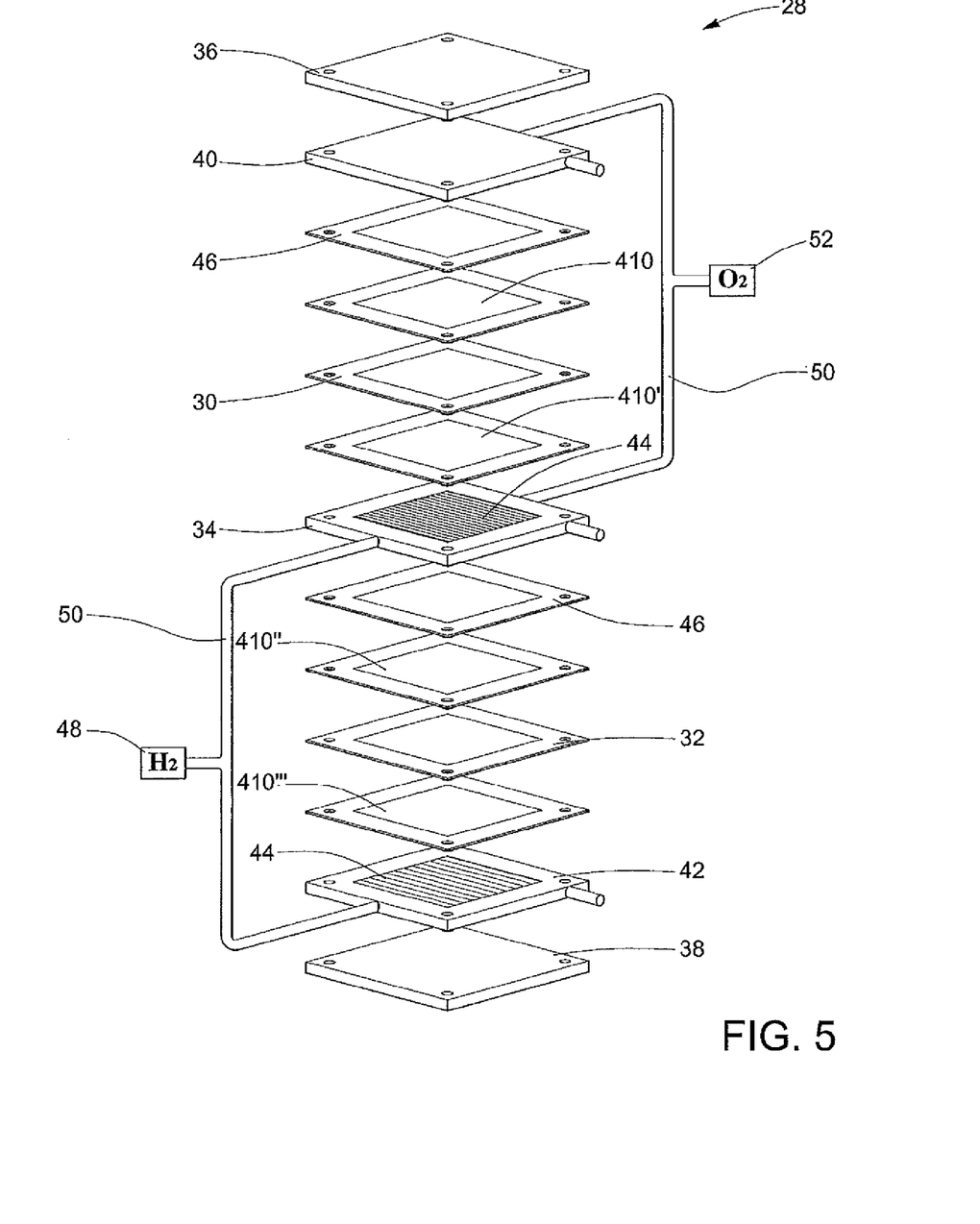
FIG. 5 is an exploded view of a fuel cell stack showing two fuel cells and including the gas diffusion medium shown in FIGS. 4a and 4b.

FIG. 5 shows a multi-cell fuel cell stack 28 including two fuel cells. It is understood that the number of fuel cells in the fuel cell stack 28 may vary. As shown, the fuel cell stack 28 has a pair of membrane electrode assemblies (MEA) 30, 32 separated from each other by an electrically conductive fuel distribution element 34, hereinafter a bipolar plate. The MEAs 30, 32 and bipolar plate 34 are stacked together between stainless steel clamping plates or end plates 36, 38 and end contact elements 40, 42. The end contact element 40 is a cathode, while the end contact element 42 is an anode. The end contact elements 40, 42, as well as both working faces of the bipolar plate 34, contain a plurality of grooves or channels 44 for distributing fuel and oxidant gases (i.e. hydrogen and oxygen) to the MEAs 30, 32. The bipolar plate 34 and end contact elements 40 and 42 may be made from metal but may also be manufactured from other materials, if desired. For example, bipolar plates and end contact elements may be fabricated from graphite which is lightweight, corrosion resistant, and electrically conductive in the environment of a PEM fuel cell stack 28.

The fuel cell stack 28 includes a plurality of diffusion media 410, 410', 410", 410'" like the diffusion medium 410 shown in FIGS. 4a and 4b. The diffusion media 410, 410', 410", 410'" are disposed adjacent a seal 46. The seal 46 adjacent the diffusion media 410, 410', 410", 410'" are gaskets that provide seals and insulation between components of the fuel cell stack 28. A portion of the perforated layers 414, 416 of the diffusion media 410, 410', 410", 410'" may be disposed immediately adjacent the seals 46 to act as sub-gaskets between the components of the fuel cell stack 28. The diffusion media 410 is disposed between the end contact element 40 and the MEA 30. The diffusion media 410' is disposed between the MEA 30 and an anode side of the bipolar plate 34, and the diffusion media 410" is disposed between a cathode side of the bipolar plate 34 and the MEA 32. The diffusion media 410'" is disposed between the MEA 32 and the end contact element 42.

When the fuel stack 28 is in use, hydrogen is supplied to the end contact element 42 and the anode side of the bipolar plate 34 of the fuel cell stack 28 from a hydrogen source 48 through a conduit 50. Oxygen is supplied as the oxidant to the end contact element 40 and the cathode side of the bipolar plate 34 from an oxygen source 52 through the conduit 50. Alternatively, ambient air may be supplied to the cathode side as an oxidant and hydrogen may be supplied to the anode from a methanol or gasoline reformer.

Figure 6:
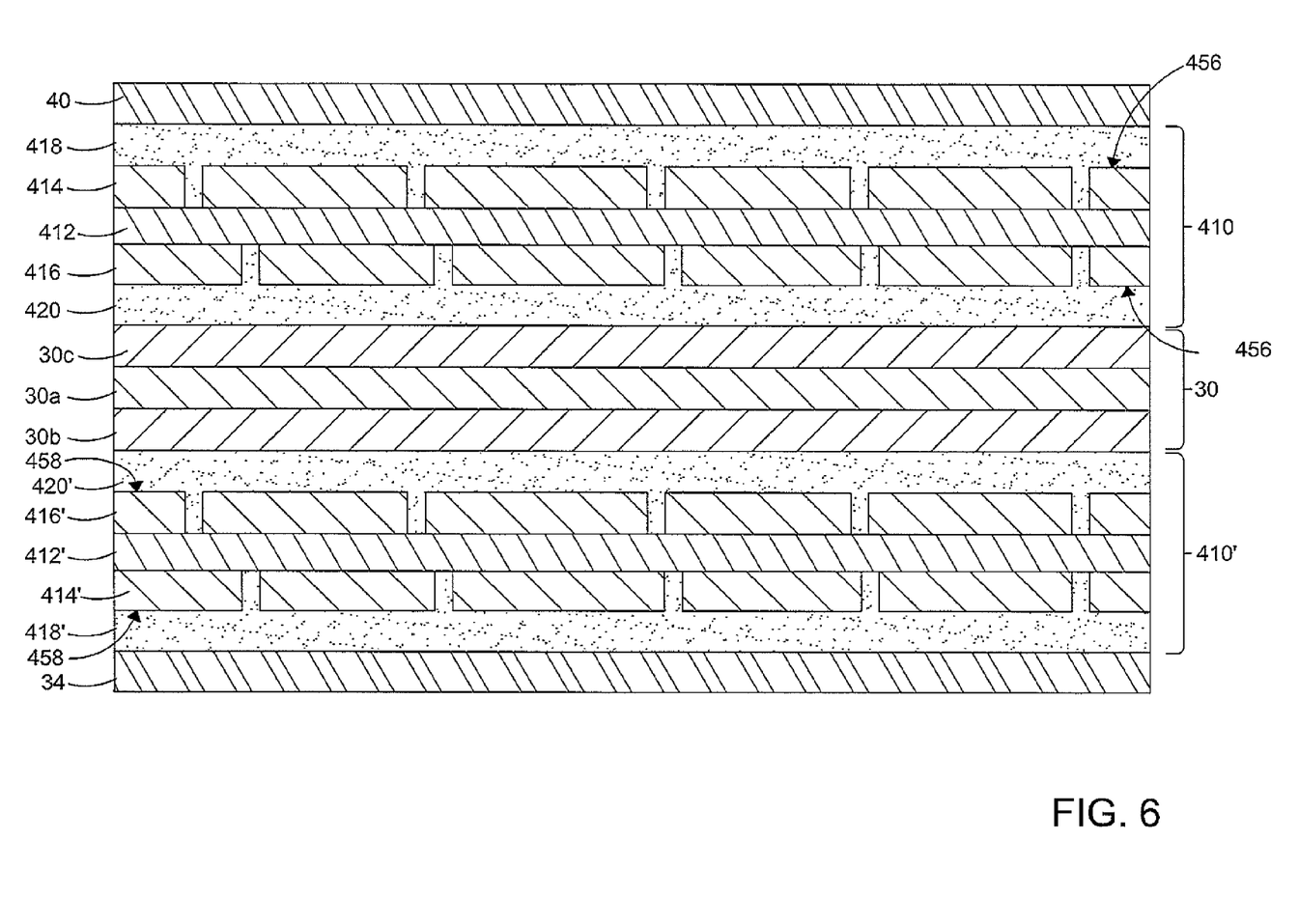
FIG. 6 is a fragmentary cross-sectional elevational view of a single PEM fuel cell including the gas diffusion medium shown in FIGS. 4a and 4b.

FIG. 6 shows a portion of a fuel cell of the fuel cell stack 28 of FIG. 5 assembled. As shown, the MEA 30 includes a proton exchange membrane 30a sandwiched between an anode electrode 30b and a cathode electrode 30c. The MEA 30 is disposed between the diffusion medium 410 and the diffusion medium 410'. The diffusion media 410, 410' and MEA 30 are disposed between the end contact element 40 and the anode side of the bipolar plate 34. The diffusion medium 410 is disposed between the end contact element 40 and the MEA 30 with the first microporous layer 418 of the diffusion medium 410 disposed adjacent the end contact element 40 and the second microporous layer 420 disposed adjacent the cathode electrode 30c. The diffusion medium 410' is disposed between the anode side of the bipolar plate 34 and the MEA 30 with the second microporous layer 420' adjacent the anode electrode 30b and the first microporous layer 418' adjacent the bipolar plate 34. The perforated layers 414', 416' of the diffusion medium 410' are substantially similar to the perforated layers 414, 416 of the diffusion medium 410.

When the diffusion media 410, 410' are in use in a fuel cell of the fuel cell stack 28, at the anode side of the fuel cells the hydrogen is catalytically split into protons and electrons. The protons permeate through the membrane 30a to the cathode side. The electrons travel along an external load circuit (not shown) to the cathode side of the MEA 30, thus creating a current output of the fuel cell stack 28. Meanwhile, oxygen is delivered to the cathode side of the MEA 30. At the cathode side, oxygen molecules react with the protons permeating through the membrane 30a, and the electrons arriving through the external circuit to form water molecules (not shown). The diffusion media 410, 410' absorb and/or wick away excess product water during wet operating conditions or at wet regions of the fuel cells of the fuel cell stack 28 to avoid flooding the electrodes 30c and 30b and also to maintain a degree of hydration of the membrane 30a to obtain decent proton conductivity during dry operating conditions or dry regions of the fuel cells of the fuel cell stack 28. Excess water in the diffusion media 410, 410' is removed from the fuel cell stack 28 through manifolds (not shown) by the flow of hydrogen and oxygen gas adjacent to and through the diffusion media 410, 410'.

Water management in the fuel cell stack 28 is integral to successful long-term fuel cell stack 28 operation. The diffusion media 410, 410' aid in water management in the fuel cell stack 28 by removing product water from the electrodes of the fuel cells, thereby resulting in optimized fuel cell performance. The diffusion media 410, 410' have several specific functions. The diffusion media 410, 410' provide access for the reactant gas from the flow channels 44 to electrode layers 30b, 30c. Additionally, the diffusion media 410, 410' are electrically conductive and thermally conductive to provide electron paths and heat removal for the operation of the fuel cell stack 28. Also, the diffusion media 410, 410' facilitate the removal of product water from the cathode side of the fuel cell stack 28 and then release the water into the flow channels 44 for removal from the fuel cell stack 28.

For the PEM fuel cell stack 28 adapted for automotive applications, a dryer steady state operating condition is favorable, requiring the diffusion medium 410 to have an adequate water retention capability to maintain a desired hydration of the membrane 30a. Since diffusion media with high diffusion resistances also reduce reactant mass transport, the diffusion properties of the diffusion medium 410 should be chosen appropriately. In areas of the fuel cell active area with a high local relative humidity and low reactant concentration, such as near the reactant gas outlets of the plates 34, 40, 42, performance may be optimized by using a diffusion medium 410 with low diffusion resistance and low tortuosity. Accordingly, the second end 458 of the diffusion medium 410 is disposed adjacent the reactant gas outlets of the bipolar plate 34. In areas of the fuel cell active area with low local relative humidity and high reactant concentration, such as near the reactant gas inlets of the plates 34, 40, 42, performance may be optimized by using a diffusion medium 410 with high diffusion resistance and high tortuosity. Accordingly, the first end 456 of the diffusion medium 410 is disposed adjacent the reactant gas inlets of the bipolar plate 34. As used herein, the active area is defined as the surface area of an individual fuel cell available for chemical reaction. The size of the active area may vary based on the total area of the fuel cell adapted to accommodate cooling, reactant distribution, and sealing mechanisms.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A diffusion medium for use in a PEM fuel cell comprising:
   a first perforated layer having a plurality of perforations formed therein;
   a second perforated layer having a plurality of perforations formed therein;
   an electrically conductive porous spacer layer disposed between said first perforated layer and said second perforated layer;
   a first microporous layer disposed on said first perforated layer; and
   a second microporous layer disposed on said second perforated layer.

2. The diffusion medium of claim 1, wherein said porous spacer layer is one of a carbon fiber paper, a foam, said first microporous layer, and said second microporous layer.

3. The diffusion medium of claim 1, wherein said first perforated layer and said second perforated layer are formed from graphite foil.

4. The diffusion medium of claim 1, wherein said first microporous layer and said second microporous layer are one of a carbon powder, a fluorocarbon polymer, and a mixture of carbon powder and a fluorocarbon polymer.

5. The diffusion medium of claim 4, wherein the fluorocarbon polymer is polytetrafluoroethylene.

6. The diffusion medium of claim 1, wherein the perforations of said first perforated layer are substantially aligned with the perforations of said second perforated layer.

7. The diffusion medium of claim 1, wherein the perforations of said first thin perorated layer are substantially offset from the perforations of said second perforated layer.

8. The diffusion medium of claim 1, wherein the perforations of said first thin perorated layer are aligned with the perforations of said second perforated layer in some areas and are substantially offset from the perforations of said second perforated layer in other areas.

9. The diffusion medium of claim 1, wherein the perforations of said first perforated layer are selectively spaced apart to result in one of a desired perforation density gradient, a desired perforation distribution, and a random perforation distribution.

10. The diffusion medium of claim 9, wherein the perforations of said second perforated layer are selectively spaced apart to result in one of a perforation density gradient and a perforation density distribution.

11. The diffusion medium of claim 1, wherein a distance between the perforations of said first perforated layer is greater than a distance between the perforations of said second perforated layer.

12. The diffusion medium of claim 11, wherein the perforations on a first end of said first perforated layer are aligned with the perforations of a first end of said second perforated layer, and the perforations on a second end of said first perforated layer are offset from the perforations of a second end of said second perforated layer.

13. The diffusion medium of claim 12, wherein the perforations of said first perforated layer are progressively less aligned with the perforations of said second perforated layer between the first ends and the second ends thereof.

14. The diffusion medium of claim 1, wherein said first perforated layer is formed from a plurality of perforated layers.

15. The diffusion medium of claim 1, wherein said first and said second microporous layer, said porous spacer layer, and said first and said second perforated layers are sintered together.

16. A diffusion medium for use in a PEM fuel cell comprising:
   a first perforated layer having a plurality of perforations formed therein, wherein the perforations of said first perforated layer are spaced apart to result in a perforation density gradient;
   a second perforated layer having a plurality of perforations formed therein;
   an electrically conductive porous spacer layer disposed between said first perforated layer and said second perforated layer;
   a first microporous layer disposed on said first perforated layer; and a second microporous layer disposed on said second perforated layer.

17. The diffusion medium of claim 16, wherein the perforations of said second perforated layer are spaced apart to result in a perforation density gradient.

18. The diffusion medium of claim 17, wherein the perforations of said first thin perorated layer are substantially offset from the perforations of said second perforated layer.

19. The diffusion medium of claim 16, wherein said porous spacer layer is at least one of a said first microporous layer and said second microporous layer.

20. A diffusion medium for use in a PEM fuel cell comprising:
    a first perforated layer having a plurality of perforations formed therein;
    a second perforated layer having a plurality of perforations formed therein, wherein a distance between the perforations of said first perforated layer is greater than a distance between the perforations of said second perforated layer;
    an electrically conductive porous spacer layer disposed between said first perforated layer and said second perforated layer;
    a first microporous layer disposed on said first perforated layer; and
    a second microporous layer disposed on said second perforated layer.

* * * * *